June 2, 1953  W. H. WATSON ET AL  2,640,513
HYDRAULICALLY ACTUATED AUXILIARY ASSEMBLY FOR SAWMILLS
Filed Aug. 1, 1947  10 Sheets-Sheet 1
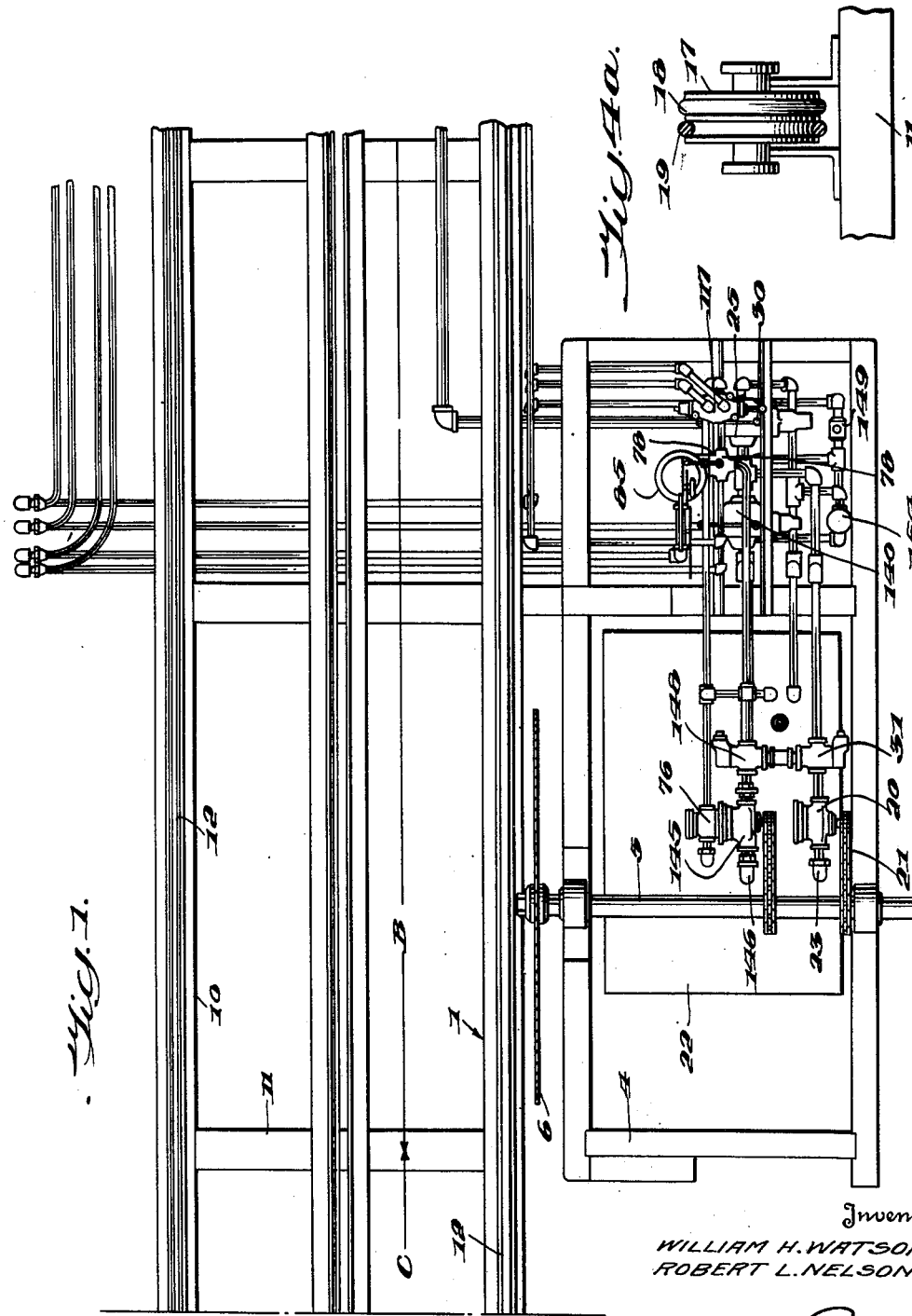
Inventors
WILLIAM H. WATSON,
ROBERT L. NELSON,
their Attorneys

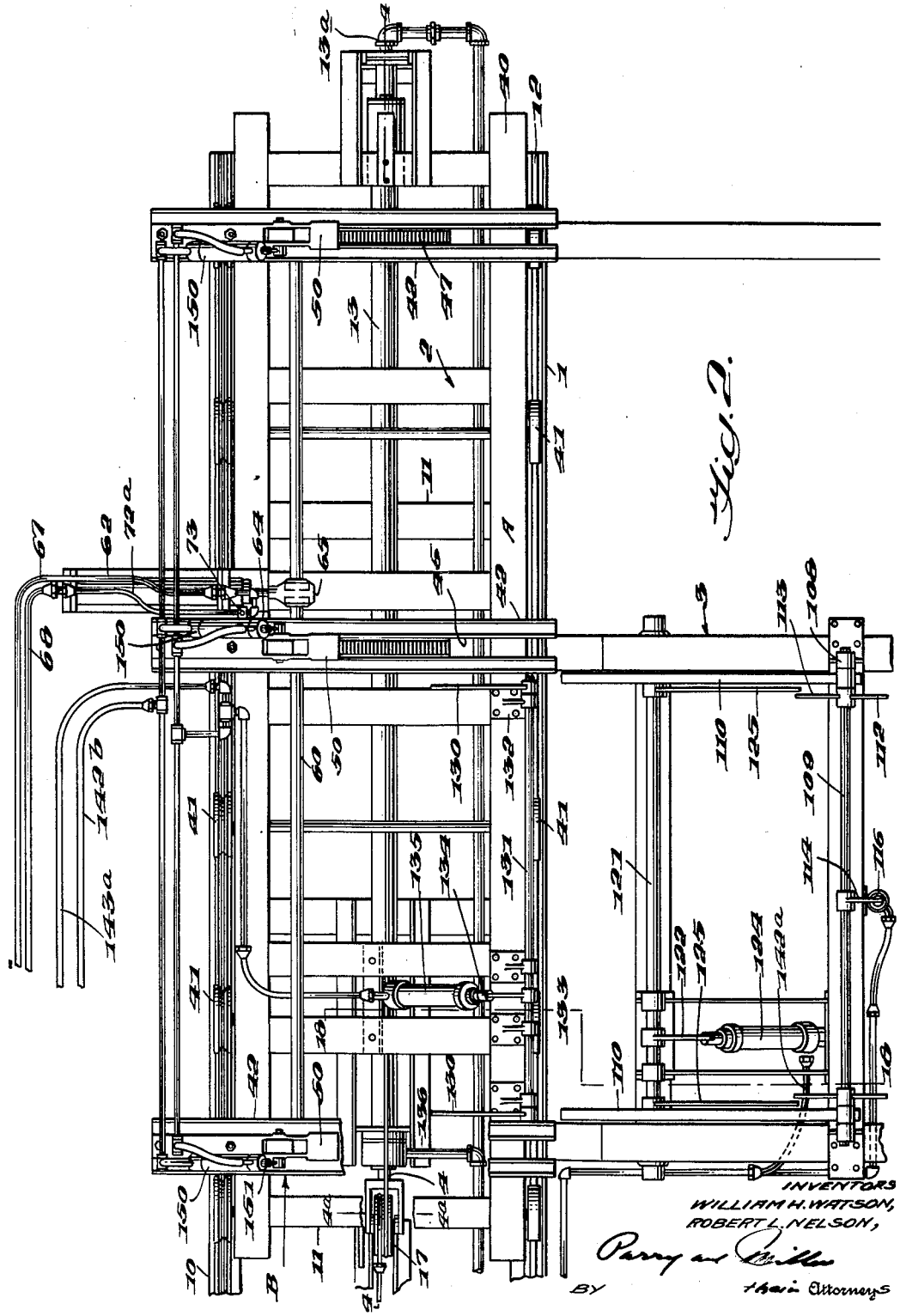

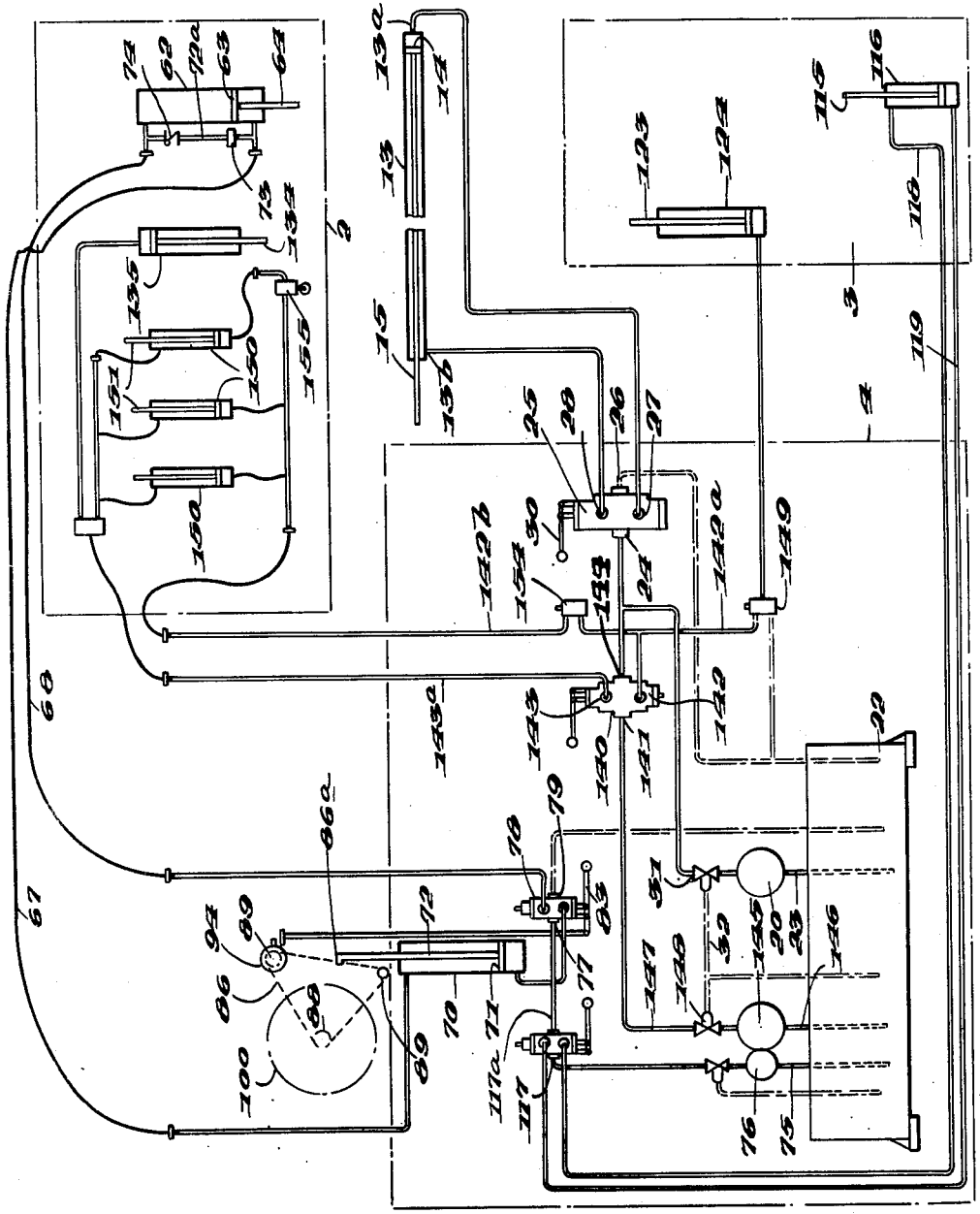

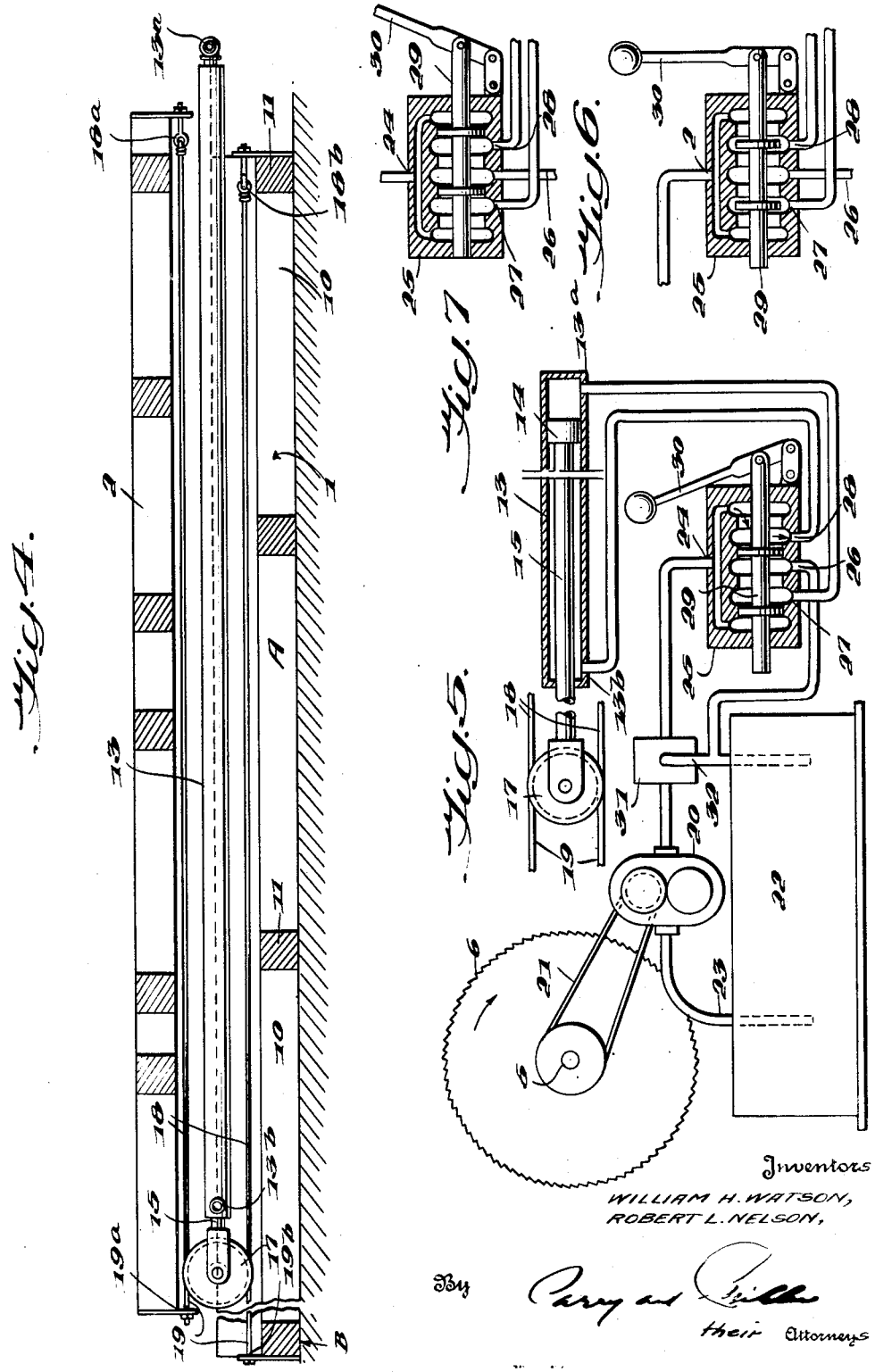

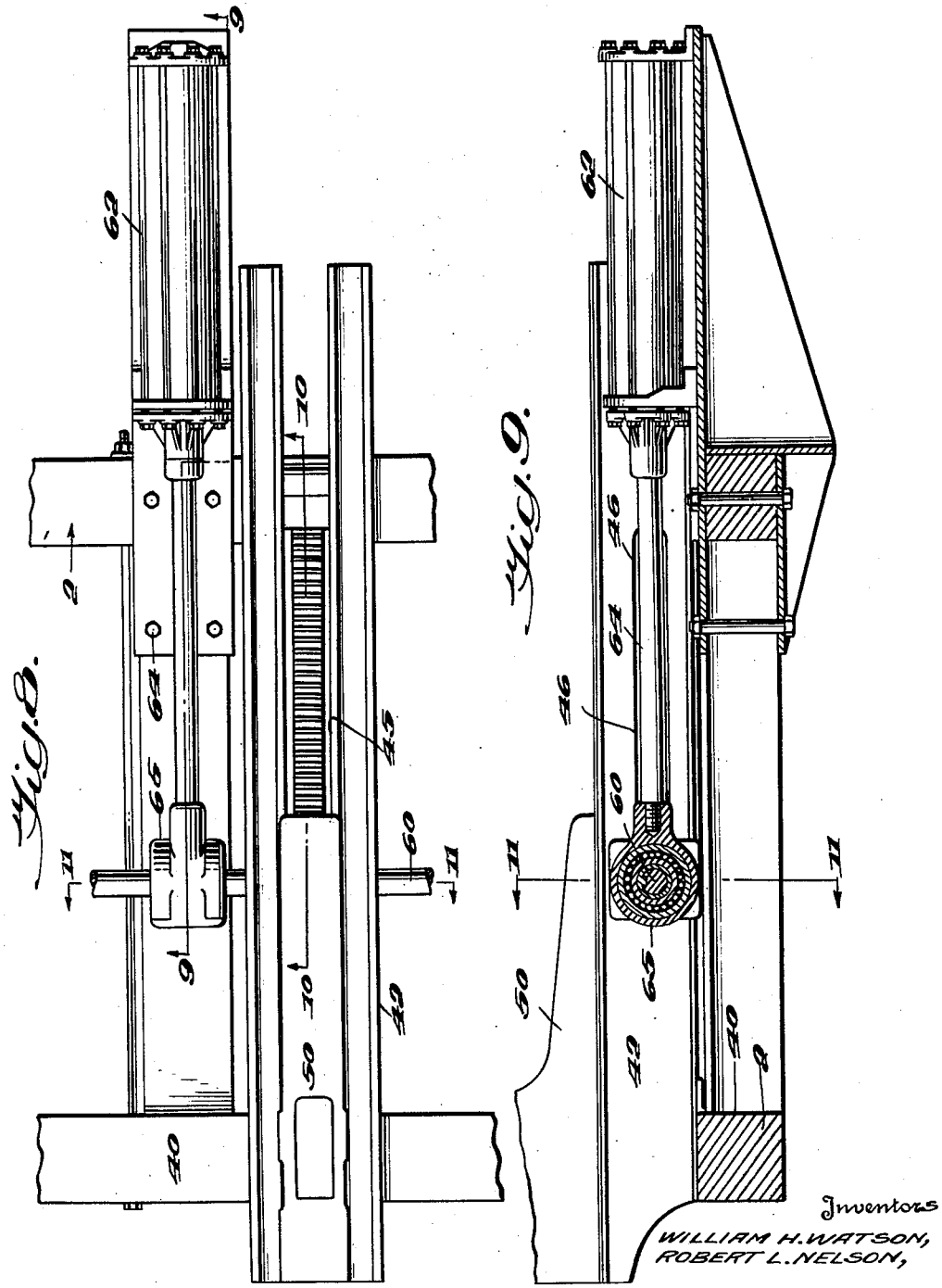

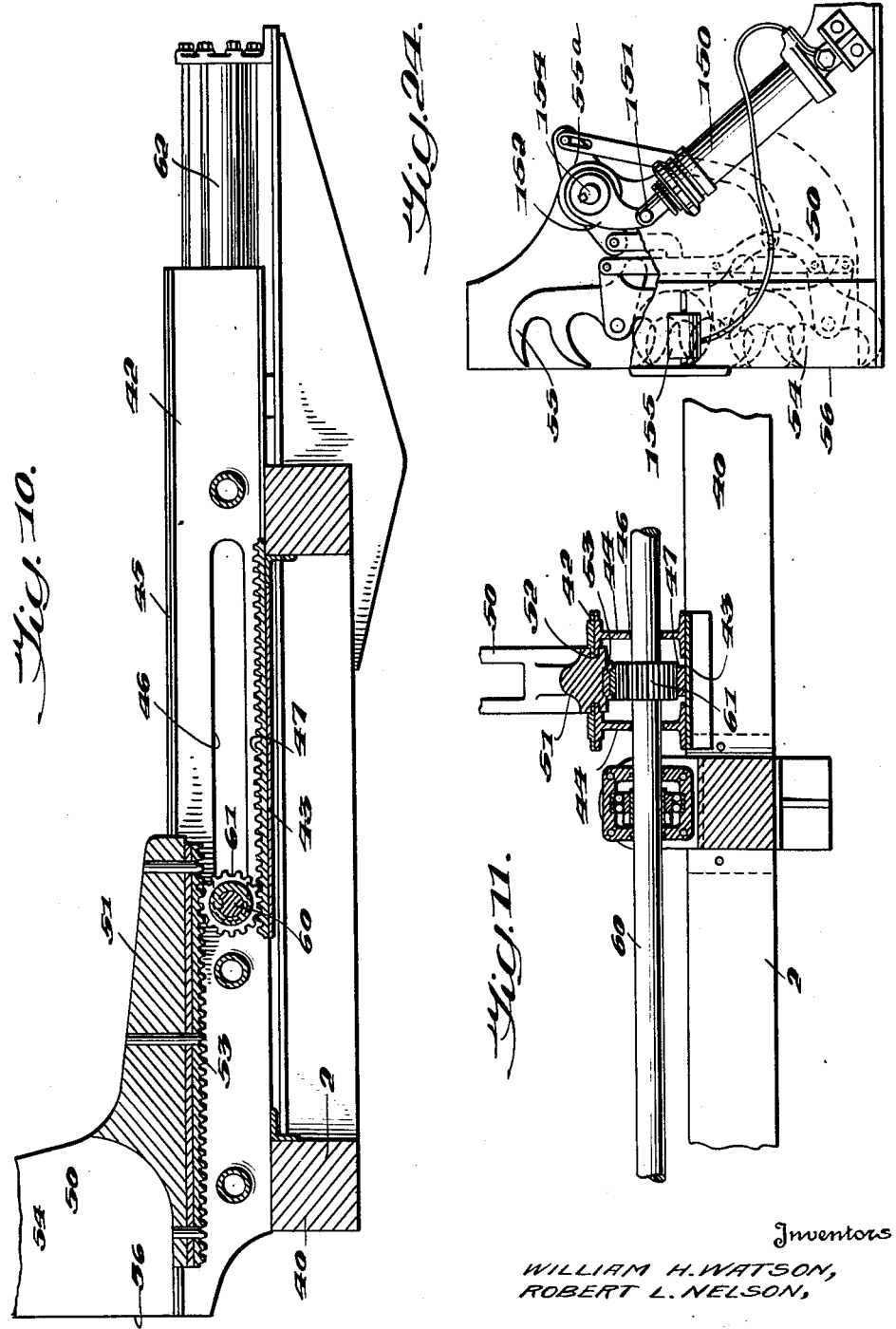

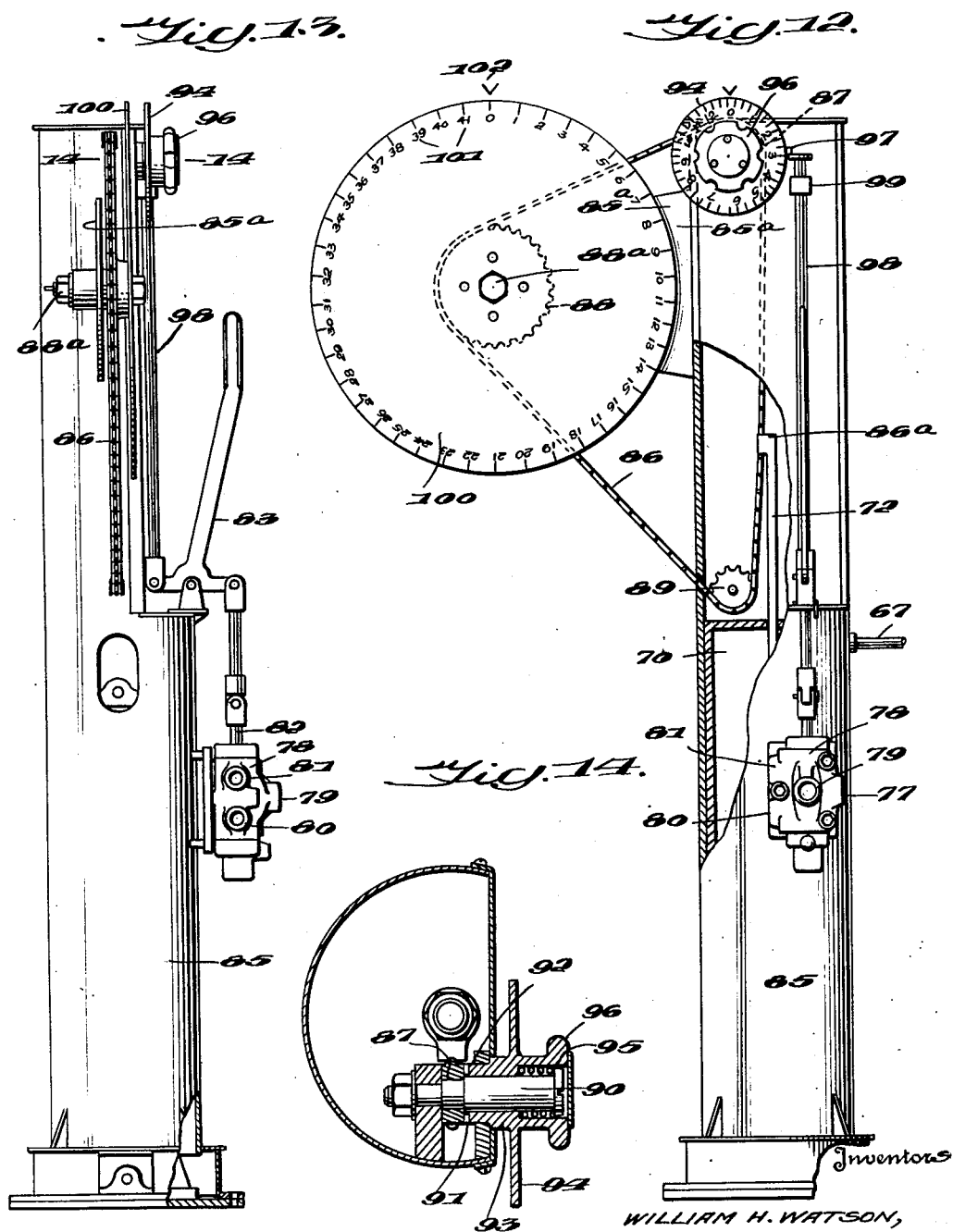

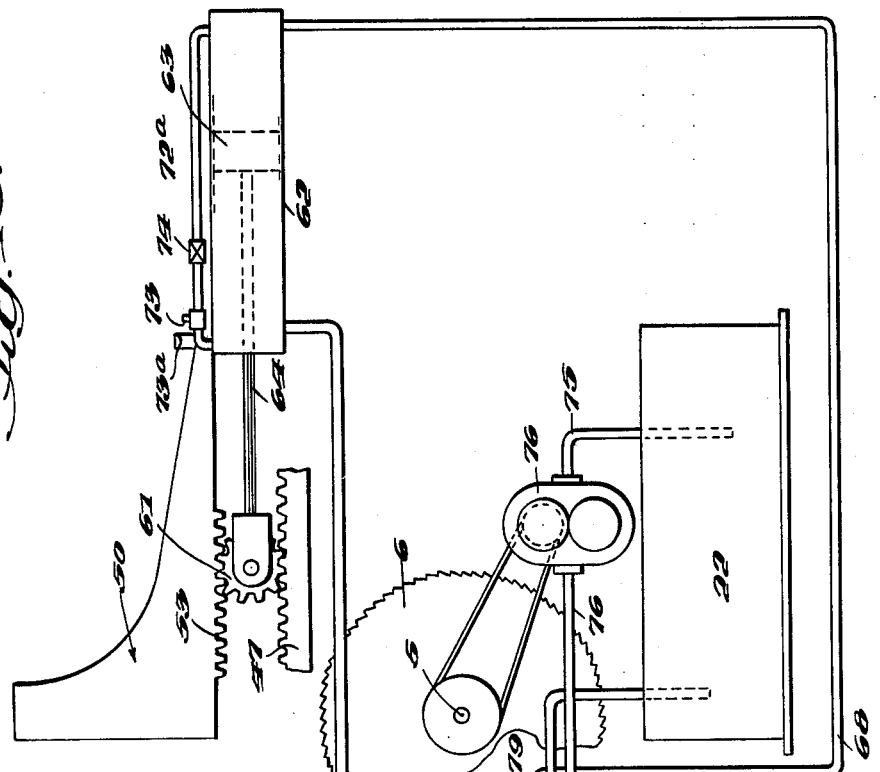
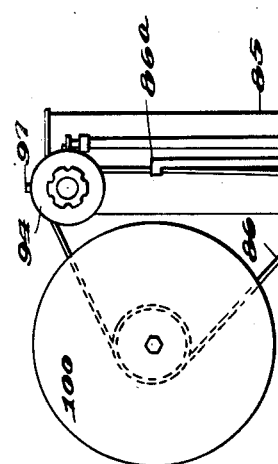
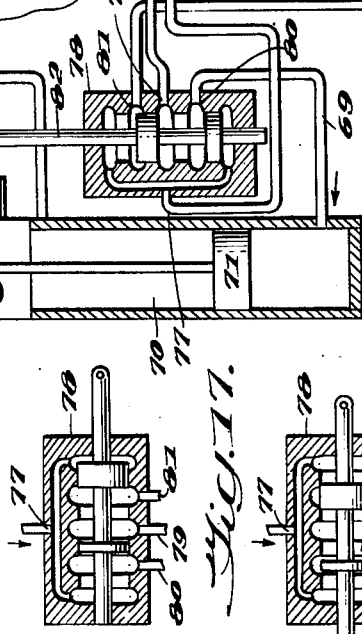
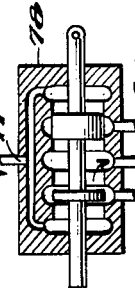

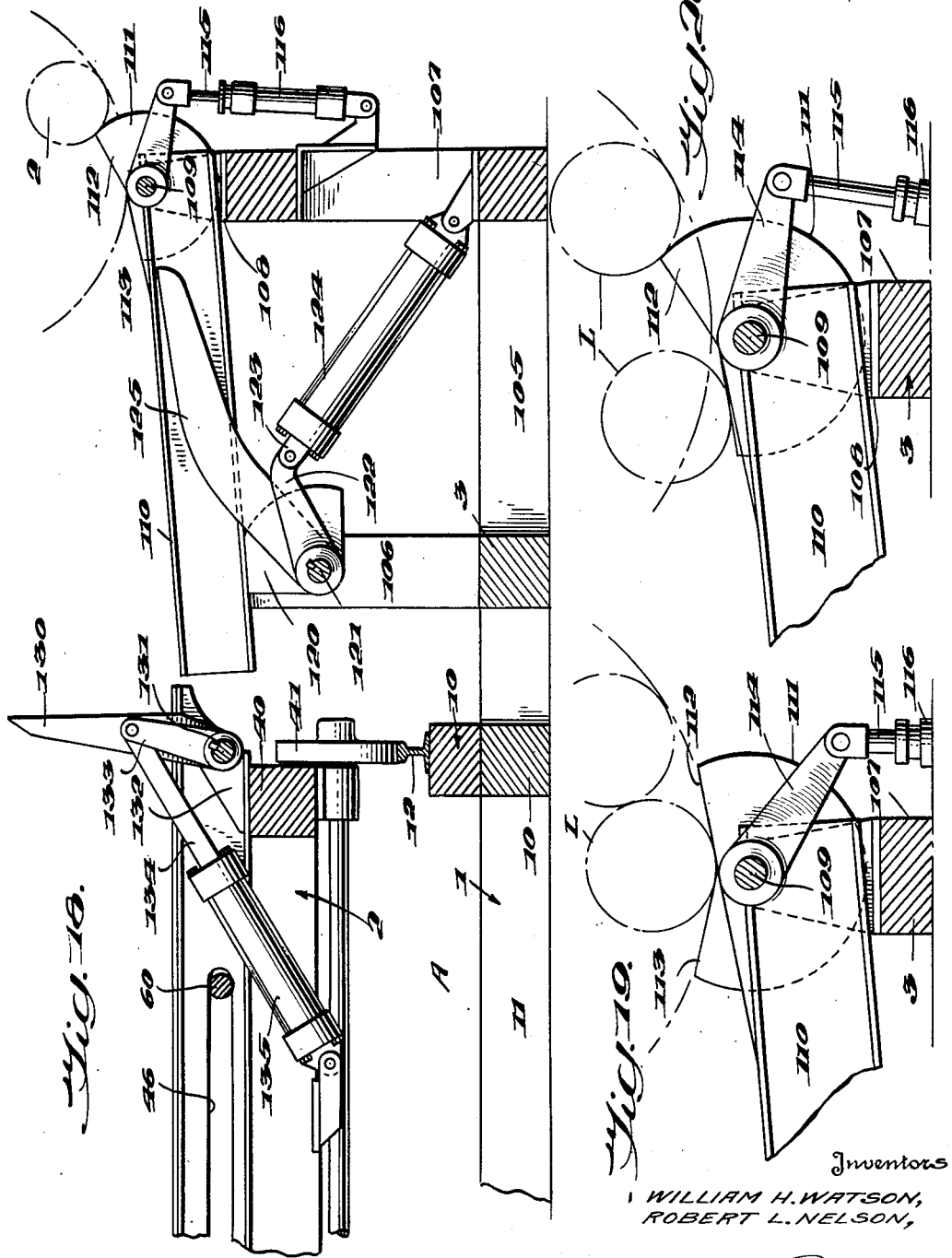

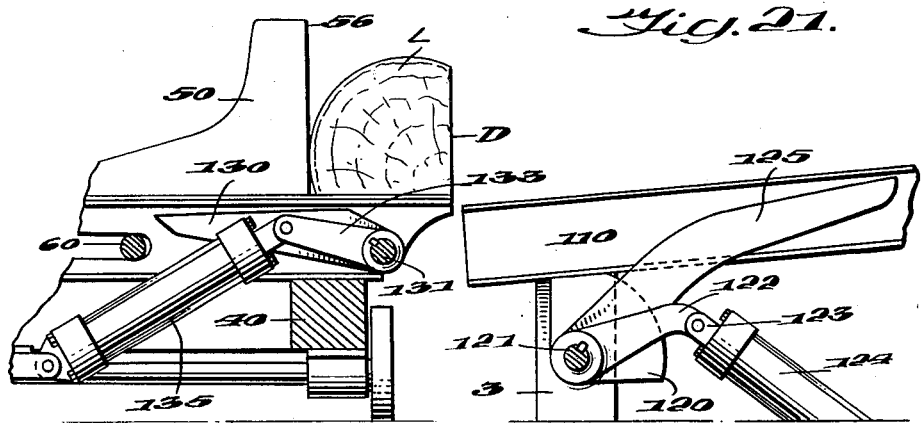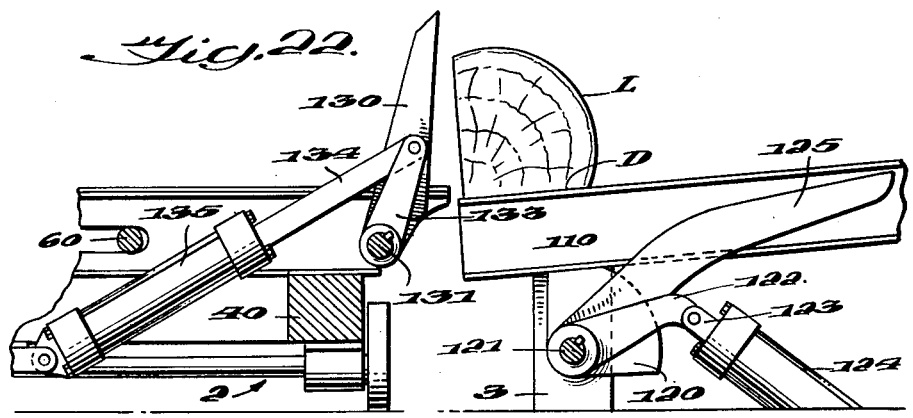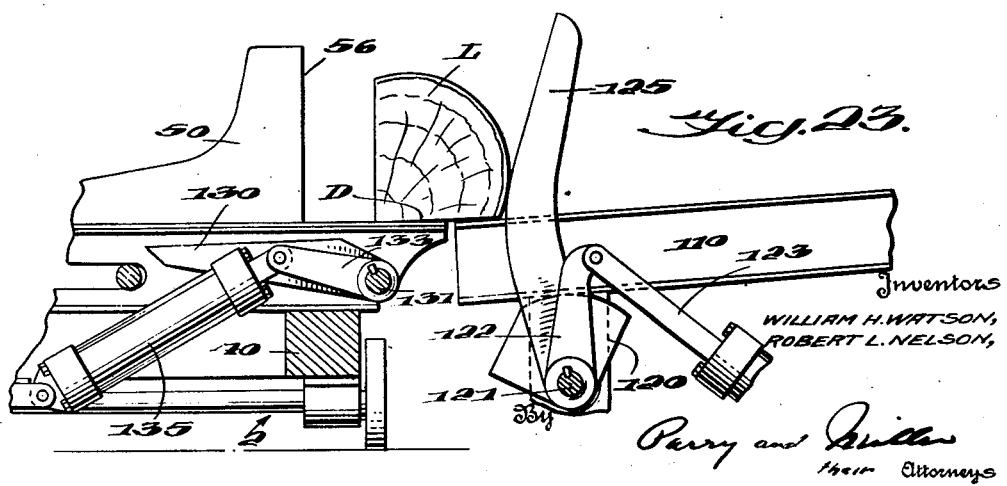

Patented June 2, 1953

2,640,513

UNITED STATES PATENT OFFICE 2,640,513

HYDRAULICALLY ACTUATED AUXILIARY ASSEMBLY FOR SAWMILLS

William H. Watson and Robert L. Nelson, Corinth, Miss., assignors to Corinth Machinery Co., Corinth, Miss., a corporation of Mississippi Application August 1, 1947, Serial No. 765,500

17 Claims. (Cl. 143—108)

The present invention relates to sawmills, and aims generally to improve existing sawmills, and particularly mills of the portable type.

One of the primary objects of the invention is the provision of an improved sawmill wherein the principal operations may be controlled by a single operator, the sawyer, thus materially reducing the labor required for operating the mill.

A further object of the invention is the provision of a hydraulically operated mill adapted to be easily and effectively controlled by a sawyer at a stationary control stand adjacent the carriage, thus eliminating the hazardous duties of workmen who ride the carriages as has heretofore been customary.

A further and subordinate object of the invention is the provision of an improved carriage feed works mechanism for operating the carriage, and more particularly to an improved hydraulically operated feed works.

A still further object of the invention is the provision of an improved set works for positioning the logs on the carriage, and more particularly to an improved hydraulically operated mechanism therefor.

A still further object is the provision of a novel control mechanism for the set works, and more particularly to the provision of means for automatically controlling the set works in accordance with a preset cut to be made.

A still further object of the invention is the provision of novel mechanism for automatically dogging and releasing the log.

A still further object of the invention is the provision of a log-loading and turning mechanism, preferably hydraulically operated, and under the control of the operator.

Other aims, objects and advantages of the invention will be apparent to persons skilled in the art to which the invention relates from a consideration of the accompanying drawings and annexed specification illustrating and describing one preferred construction of portable mill embodying the invention.

In the drawings—

Fig. 1 is a plan view of the sawing section of a portable mill and a portion of the delivery section illustrating a preferred position of the sawyer's control stand;

Fig. 2 is a plan view complementary to Fig. 1 of the receiving or loading section of the mill and illustrating the carriage in loading position;

Fig. 3 is a flow diagram of a hydraulic sawmill embodying the invention;

Fig. 4 is a longitudinal sectional view of the feed works drive as taken on the line 4—4 of Fig. 2;

Fig. 4ª (sheet 1) is a detail transverse sectional view as taken on the line 4ª—4ª of Fig. 2;

Fig. 5 is a diagrammatic view illustrating the hydraulic system for controlling the carriage feed works and illustrating the control valve in its gig back position;

Fig. 6 is a sectional view of a typical feed works control valve in neutral position;

Fig. 7 is a sectional view of the feed works control valve in its feed position;

Fig. 8 is an enlarged plan view of the knee set works mechanism;

Fig. 9 is a longitudinal sectional view taken on the line 9—9 of Fig. 8;

Fig. 10 is a longitudinal sectional view as taken on the line 10—10 of Fig. 8;

Fig. 11 is a transverse sectional view as taken on the line 11—11 of Figs. 8 and 9;

Fig. 12 is a front elevation of the set works control stand;

Fig. 13 is a side elevation thereof;

Fig. 14 is a transverse sectional view as taken on the line 14—14 of Fig. 13;

Fig. 15 is a diagrammatic view of the hydraulic system for operating the set works and illustrating the set works control valve in set position;

Fig. 16 is a sectional view of a typical set works control valve in its recede position;

Fig. 17 is a sectional view of the set works control valve in its neutral position;

Fig. 18 is a transverse sectional view through the turner and loader mechanism as taken on the line 18—18 of Fig. 2;

Fig. 19 is an enlarged detail sectional view showing the kicker mechanism in position to receive a log;

Fig. 20 is a similar view showing the kicker mechanism in position to discharge a log upon the loading deck rails;

Fig. 21 is a sectional view similar to Fig. 18, showing the position of the turner and loader mechanism at the finish of a cut;

Figs. 22 and 23 are similar views illustrating the operation of the turner and loader mechanism to turn the log; and Fig. 24 (sheet 6) is a detail elevation of a log-positioning knee and boss-dogging mechanism, a portion of the knee being broken away to show a portion of the dogging mechanism in full lines.

Referring to the drawings, the mill advantageously is of the portable type, adapted to be transported in sections for erection in the timber field. Such portable mills usually comprise a track frame 1, carriage 2, loader frame 3 and husk frame 4, the latter having a saw arbor 5 carrying a circular rotary saw 6.

The track frame

The track frame 1 is advantageously constructed in sections, preferably three in number, for ease of transportation and assembly. These sections may be identified as a loading section A, a sawing section B and take-off section C, each of which comprises side frames 10 and cross ties 11, suitably secured together. The side frames 10 preferably carry rails 12 upon which the carriage wheels roll in their travel from the loading section A to the take-off section C.

The loading section of the frame carries the carriage feed works which, in the illustrated form, comprises an elongated cylinder 13 extending the full length thereof, having inlet ports 13a and 13b at opposite ends thereof for the admission of fluid under pressure thereto. See Fig. 3. The cylinder 13 is provided with a piston 14 having a rod 15 extending through the end of the cylinder adjacent the section B which is packed by a suitable stuffing box. The free end of the rod carries a double groove sheave 17 (Figs. 2, 4 and 4a) about which are trained cables 18—19, each having one end secured to the frame 1 and an opposite end secured to the carriage 2. The cross sectional area of the piston rod 15 is preferably at least one-half the cross sectional area of the cylinder so as to proportionately reduce the volume of the cylinder at the rod end, permitting retrograde or gig back stroke of the piston and carriage to be approximately twice the speed of the feed stroke.

The double sheave and cable connection between the frame 1 and carriage 2 effects a two-to-one travel of the carriage with respect to the travel of the sheave 17 or piston rod 15. It will be noted in Fig. 4 that the cable 19 is securely attached at one end of a forward end of the carriage 2, as at 19a, and the other end to the frame 1 adjacent the junction between the sections B and C, as at 19b, while the cable 18 is attached at one end to the rear end of the carriage 2, as at 18a, and at the other end to the frame adjacent the junction between sections A and B, as at 18b. Thus, the travel of the carriage 2 is twice that of the sheave 17, and while the sheave is moving throughout the length of the intermediate section B, the carriage moves from the loading section A to the take-off section C.

The piston 14 is displaced in the cylinder 13 to move the sheave 17 and carriage 2 by fluid, for example oil, admitted to the selected end of the cylinder 13. The actuating fluid is preferably supplied to the cylinder by means of a rotary pump 20 (Figs. 3 and 5) having a rated capacity in gallons per minute. The pump 20 is preferably driven from the saw arbor 5 by a chain or similar drive 21 so that the volume of fluid discharged by the pump per minute varies directly with the speed of revolution of the saw. This is of material advantage because, as the speed of the saw is reduced as it encounters tough or knotty sections of the log, the rate of carriage feed is proportionately reduced, thus reducing likelihood of damage to the saw 6.

The hydraulic system for operating the feed works, of which the cylinder 13 and piston 14 are the principal parts, comprises a closed system (see Fig. 5), including a reservoir 22 for a supply of liquid, such as oil, and housing a supply pipe 23 connected at one end to the inlet side of the pump 20 and having its opposite end submerged in the liquid within the reservoir 22.

The outlet of the pump 20 is connected to the inlet port 24 of a manually operated control valve 25 which has an exhaust port 26 returning fluid to the reservoir 22, a feeding outlet 27 and a gig back outlet 28 connected respectively to the ports 13a and 13b of the feed works cylinder 13. The valve 25 has a shiftable spool valve stem 29 movable manually as by lever 30 to gig back, neutral and feeding positions, illustrated in Figs. 5, 6 and 7. The pump 20, being continuously driven, continuously delivers fluid to the inlet port 24 of the valve 25. When the handle 30 and stem 29 are in their neutral positions (see Fig. 6), the flow is from inlet 24 to exhaust port 26 and back to the reservoir 22.

A suitable relief valve 31 may be provided in the line between the pump 20 and the valve 25 to return fluid to the reservoir 22 through line 32 when the pump 20 delivers an excessive amount of fluid or when the pressure thereof exceeds a predetermined value as may be required by the operating parts of the system.

From the above it will be observed that the carriage feed works is hydraulically operated and is fully under the control of an operator, for example, the sawyer, who may accurately control movements of the carriage by simply shifting the control lever 30 to the desired position. When the valve 25 is shifted to neutral position, as in Fig. 6, at the conclusion of any movement, both ports 13a and 13b of cylinder 13 are on exhaust through ports 27 and 28, permitting the carriage to coast, and thus avoiding sudden jars in halting movement of the carriage. The pump will be of sufficient capacity to supply a sufficient volume of fluid to the port 13a of the cylinder 13 to move the carriage on its feed stroke at a desired speed for example, 300 feet per minute.

The carriage

The carriage 2 may be of any desired construction suitable for the type of mill in which the invention is employed, and for portable mills, as illustrtaed, may conveniently comprise a rectangular frame 40 having wheels 41 rolling on the rails 12 of the frame 10. See Fig. 2. Attached to the forward end of the carriage is one end of the cable 19 and an end of the cable 18 is secured to the rear end of the carriage, so that it is rolled along the rails 12 proportionately and at an accelerated rate relative to the piston rod 15 and sheave 16.

The carriage is provided with a plurality of tranversely disposed head blocks 42, preferably three in number, and longitudinally spaced thereon, and each of these head blocks supports slidable knees 50 common to such mills.

The head blocks 42 are preferably of box-like form (see Fig. 11) comprising a head block base 43 and spaced side members 44 preferably of I-beam sections. These spaced side members provide a slotted guideway 45 (Fig. 10) in the upper face of the head block in which the knees slide. The side members 44 are provided with an elongated slot 46 in their webs and the base plate 43 is provided with a rack member 47 preferably disposed between the side members 44.

The knees 50 preferably comprise a base 51 slidable in the guideway 45, grooved, as at 52, along the side thereof to receive the spaced portions of the head block 42 on opposite sides of the guideway 45. Secured to the bottom of the knee base 51 is a rack member 53 for cooperation with the set works pinion, hereinafter described. The knees 50 are provided with the usual upright stands 54 for housing the usual dogs 55 (Fig. 24) to hold the logs securely against the positioning face 56 of the knee.

The set works

Sawmill set works is a mechanism provided for shifting the knees along the head blocks to position the log on the carriage for a predetermined cut. The set works of portable mills usually are operated by one or more operators who ride the carriage, and the dogs are manually operated by the same or additional operators.

The present invention provides a novel set works under control of the sawyer at the stationary control stand for shifting the knees to accurately position the log for a predetermined cut. It further provides novel dog-operating means automatically operable to grip and release the log, as will be hereinafter more fully pointed out.

In the illustrated embodiment of the invention, the set works includes a set shaft 60 extending longitudinally of the carriage and disposed within the elongated slots 46 of the head blocks 42 and carrying pinions 61 in mesh with the racks 47 and 53, respectively, on the head block base 43 and knees 50. The shaft 60 is moved transversely of the carriage by suitable means mounted on the carriage and controlled from the sawyer's control stand, preferably a hydraulically operated cylinder 62 and piston 63, Figs. 8, 9 and 15, the rod 64 of which has an antifriction coupling 65 with the shaft 60. Movement of the piston rod 64 moves the shaft 60 longitudinally of the slots 46 and causes the pinions 61 to roll along the racks 47 of the head blocks. As the pinions 61 are also in mesh with the knee racks 53, the knees will be correspondingly moved along the head blocks at a rate of twice the movement of the shaft 60.

Actuating fluid for moving the piston 63 in the cylinder 62 is supplied to opposite ends of the cylinder by flexible hose or conduits from a suitable control valve at the sawyer's control stand.

A set works control cylinder 70 (Figs. 3, 12 and 15) at the sawyer's control stand balances the cylinder 62 and preferably is of the same size and capacity as the cylinder 62. The piston rod ends of the two set works cylinders 62 and 70 are in open communication by means of a flexible hose 67 so that the piston 71 in the cylinder moves proportionately to the piston 63 in cylinder 62, it being understood that the two cylinders 62 and 70, forwardly of their respective pistons, as well as the hose 67, are constantly filled with fluid, for example oil.

Means are provided to automatically replenish any fluid that may leak from the piston rod ends of cylinders 62 and 70 as well as the hose connection 67, and such means advantageously may be in the form of a synchronizing line 72a in communication with opposite ends of cylinder 62 and fitted with a trip valve 73, normally closed, but opened by a cam 73a when the cylinder 62 is fully extended. A check valve 74 is provided to prevent return of fluid from the piston rod end to the closed end of the cylinder, as when the latter is on exhaust.

The hydraulic system for operating the set works, of which the cylinders 62 and 70 are principal parts, comprises a closed system including a reservoir 22 for a supply of fluid, for example oil, and housing a supply pipe 75 connected at one end to the inlet side of a rotary pump 76 and having its opposite end submerged in the liquid in the reservoir 22. The outlet of the pump 76 is connected with the inlet port 77 of a manually operated control valve 78 which has an exhaust port 79 returning liquid to the reservoir 22, a set cylinder outlet 81 connected to the closed end of the cylinder 62 and a recede cylinder outlet 80 connected to the closed end of the cylinder 70. The valve 78 has a shiftable spool valve stem 82 movable manually, as by lever 83, to setting, neutral and recede positions. The pump 76 preferably is continuously driven by suitable means, as from the saw arbor 5, and delivers fluid continuously to the inlet port 77 of the valve 78.

When the valve is in the neutral position (see Fig. 17) the fluid delivered by the pump 76 to the inlet port 77 is bypassed to exhaust port 79 and is returned to the reservoir. When the valve 78 is moved to set position (Fig. 15), the flow of fluid is from inlet 77 to outlet 81 and thence through flexible hose 68 to actuating end of set cylinder 62 to move the set shaft 60 and the knees toward the line of cut. When the valve 78 is shifted to the recede position (Fig. 16), the flow of fluid is from the inlet 77 to outlet 80 and thence through line 69 to the actuating end of control cylinder 70.

The invention provides means for automatically stopping movement of the set works, in setting direction, upon completion of movement of the knees 50 to position a log for a predetermined cut, and preferably such means are located at the sawyer's control stand and automatically operates the control valve 78 as a result of the movement of the set works control piston 71.

In the illustrated embodiment of the invention (see Fig. 1), the sawyer's control stand is preferably located at one side of the carriage 2, and between the husk frame 4 and loader deck 3. The stand preferably includes a vertical column 85 housing in its lower part the set works control cylinder 70, and the column 85 advantageously provides a support for the control valve 78, operating lever 83, pre-set dial 94 and finish indicator 100, as is illustrated in Figs. 12, 13 and 14.

Referring to Figs. 12 and 15, the set works control piston 71 has a rod 72 extending through the upper end of the cylinder 70 and connected as at 86a to a flexible drive means, for example, a chain 86, trained over spaced sprockets 87, 88 and 89 mounted on the column 85. The sprocket 87 (Fig. 14) is loosely mounted upon a stud shaft 90 and is provided with a clutch face 91 adapted for clutching engagement with a cooperating clutch face 92 on an end of the hub portion 93 of a pre-set dial 94 also loose on the shaft 90, the hub portion 93 being normally biased into clutched engagement with the sprocket 87 by means of a spring 95. The outer end of the hub portion 93 is provided with a handle member 96 to move the hub longitudinally along the shaft 90 against the tension of the spring 95 to disengage the clutch faces 91—92. The pre-set dial 94, being normally clutched to the sprocket 87 rotates synchronously with the reciprocatory movements of the set works control piston 71 and its piston rod 72 to which the chain 86 is fastened, and is provided with an actuating lug 97 for actuating a valve control rod 98 movable in guides 99 on the stand 85 and pivotally connected to the set works valve control lever 83 to move the lever and valve stem 82 to neutral position.

The pre-set dial is graduated for inches and fractions for cut to be made with allowance for the thickness of the saw cut. To pre-set the set works for any predetermined cut, the clutch 91—92 is disengaged and the dial 94 turned counterclockwise to position the lug 97 above and to the left of the upper end of the valve control rod 98. The set works control valve lever 83 may then be moved to set position, which raises the valve control rod 98, shifts the valve to the position shown in Fig. 15, and supplies fluid to the closed end of cylinder 62 to move the piston 63 on its setting stroke. As the piston 63 moves outwardly in its cylinder 62, the piston 71 moves downwardly in the cylinder 70 an exact corresponding distance, moving the chain 86 connected to the rod 72 and rotating the pre-set dial in a clockwise or retrograde direction. When the set works piston 63 has moved sufficiently to effect the predetermined set of the knees, the pre-set dial 94 has moved correspondingly, whereupon the lug 97 engages the upper end of control rod 98 to actuate the rod and move the valve lever 83 to its neutral position.

The invention further provides a visual indicator illustrated as positioned at the sawyer's control stand, and automatically operable to indicate the position of the knees 50 on head blocks, and hence the reserve (in inches) of the log to be cut.

In the illustrated embodiment of the invention, one of the sprockets about which the chain 86 is trained, for example the sprocket 88 is fastened to a shaft 88$^a$ journalled in an arm 85$^a$ of the sawyer's control stand.

Mounted on the shaft 88$^a$ is a dial indicator 100 having circumferential graduations 101 equivalent to the transverse travel of the knees 50 on the head block 42. The graduations 101 represent in inches the distance the knee face 56 is removed from the line of cut, and hence indicates to the sawyer the thickness of log remaining to be cut. If, for example, a partially sawed log, eight inches thick, is presented by the knees, with the flat surface in the line of cut, the face 56 of the knees will be eight inches removed from the line of cut and the indicator 100 will register "8" at the top of the dial under the pointer 102. This indication is assured because the dial indicator sprocket 88 is actuated by the chain 86 fastened to the piston rod 72, the movement of which corresponds to the movement of the set works cylinder piston 63.

It will be understood that the dial indicator need not be mounted on the stand 85, but may be mounted at any convenient location visible to the operator.

*The log loading and turning mechanism*

The invention provides mechanism under the control of the operator at the sawyer's control stand for loading logs upon the carriage and turning the logs after one or more cuts have been made.

Referring to Figs. 2 and 18, a log-loading deck is mounted at one side of the loading section A of the frame 1 and comprises a framework 105 having uprights 106 and 107 spaced laterally on the framework. Mounted on upright 107 are bearings 108 for a shaft 109 pivotally supporting one end of a pair of loading deck rails 110 extending transversely of the frame and terminating adjacent the carriage 2.

Fixedly secured to the shaft 109 are a plurality of log selectors or kickers 111 (Figs. 18, 19 and 20), each preferably in the form of a disc and each having an obtuse angular recess providing a pair of log stops 112—113. The log selectors are adapted to be rocked about the axis of the shaft 109 by suitable means, as for example, an arm 114 connected to the piston rod 115 of a hydraulic piston and cylinder device 116. The cylinder 116 is double acting and is supplied with fluid under pressure from a control valve 117 at the sawyer's control stand. This valve is of a type similar to the set works valve 78 and is not shown in detail herein. The exhaust port 117$^a$ is connected with the inlet port 77 of the set works valve 78 so that when valve 117 is in neutral position, fluid from pump 76 will be circulated to set works valve 78.

The normal position of the selector or kicker is up, as shown in Fig. 18, so that the stop 112 engages and holds a log on a runway. When the valve 117 is shifted to admit fluid from pump 76 to line 118 and to upper end of cylinder 116, the selector is rocked to lower the stop 112, as shown in Fig. 19, and the previously held log rolls to the center of the selector and is held by the raised stop 113. Reversing valve 117 to admit fluid to line 119 and the lower end of cylinder 116 raises the kicker again to its normal position, discharges the selected log onto the loading deck rails 110 and holds back the next adjacent log as shown in Fig. 20. In the neutral position of valve 117, line 119 is blocked, thus maintaining kicker 111 in its normal position.

The opposite ends of the rails 110, adjacent the carriage 2, are supported on cams 120 mounted on a shaft 121 journalled in the frame uprights 106, which shaft is rocked by a crank arm 122 pivotally connected to a piston rod 123 working in a loader cylinder 124. Secured to the shaft 121 are outwardly extending loader arms 125, and conveniently these arms may be welded to the cams so as to be adjacent to the rails 110. In their normal position the upper edge of these arms is just below the plane of the top of the rails 110.

The loader cylinder is preferably single acting and is operative to rock the shaft 121 and swing the arms upwardly to roll a log down the rails and upon the carriage 2. Rocking of the shaft also rocks the cams 120 to raise the free ends of the rails 110 to or slightly above the level of the carriage head blocks 42 as is shown in Fig. 23.

The log turning mechanism comprises a pair of turner arms 130 working in combination with the loader arm 125. These arms 130 are secured to a shaft 131 mounted in the bracket bearings 132 on a side rail 40 of the carriage 2, which shaft 131 is adapted to be rocked by a crank 133 connected to a piston rod 134 working in the turner cylinder 135 pivotally mounted on the carriage.

During sawing, the loader arms 125 and the turner arms 130 are both in their lowered position as shown in Fig. 21. When a flat face D has been cut upon a log L, the turner cylinder 135 is operated to raise the turner arms 130 and roll the log over on the loading deck rails 110 with the flat face D down against the rails as shown in Fig. 22. The loader arms 125 are then raised to push or slide the log back upon the carriage head blocks as shown in Fig. 23, the ends of the rails 110 being raised slightly above the level of the head blocks by the cams 120. The cylinder 135 being single acting, returns by gravity to its lowered position.

The admission of operating fluid to the turner cylinder 135 and the loader cylinder 124 is conveniently controlled by a turner and loader control valve 140 located at the sawyer's control stand (see Fig. 3), which valve may be of a type similar to the feed works valve 25, and hence is not specifically illustrated in detail. It has an inlet port 141 (Fig. 3), outlets 142 and 143 leading respectively to the loader cylinder 124 and turner cyinlder 135, and an exhaust port 144. The inlet port 141 of the valve 140 is supplied with fluid from a pump 145 drawing fluid through a supply pipe 146 from a reservoir 22, and discharging to the valve 140 through line 147 in which is placed a relief valve 148 for by-passing fluid to the reservoir when pressure is excessive.

When the valve 140 is moved to the turner position, fluid is admitted through line 143a to actuate the log turner mechanism as above described. When the valve is moved to the opposite or loader position, fluid is admitted to line 142a leading to the loader cylinder. A normally closed treadle operated valve 149 is, however, interposed in line 142a which is subject to the control of the operator at the sawyer's control stand for operating the loader mechanism.

The dog mechanism

The upright stands 54 of the knees 50 are open to house the boss dogs 55 which may be of usual construction, each adapted to be operated by a lever 55a. See Fig. 24. These dogs may be of a well known type currently in use in portable sawmills, known to the trade as McDonough boss dogs, and hence are not illustrated and described in detail. The present invention provides automatic means under the control of the operator at the sawyer's stand for operating the dogs of two or more knees in unison.

In the illustrated embodiment, each of the knees 50 is provided with a dogging cylinder 150 having a piston and rod 151 therein connected to a crank arm 152 on the dog shaft 154 which commonly is connected to the lever 55a and connects a series of dogs of each knee for operating them in unison in their opening and closing movements as will be understood. The cylinders 150 are double acting and operate to close the dogs when fluid is admitted to the closed end of the cylinders and to open them when admitted to the opposite end.

The operation of the dogs is advantageously controlled from the loader and turner control valve 140, as will be apparent from Fig. 3.

Movement of the valve 140 to turner position admits fluid to line 143a and to the rod ends of the cylinders 150 to release the dogs simultaneously with the operation of the turner mechanism cylinder 135. As the valve 140 is shifted to the opposite position (see Fig. 3), fluid is admitted to line 142a and its branch line 142b leading, respectively, to the loader cylinder 124 and the closed ends of dogging cylinders 150. This line 142b has a treadle operated valve 154 located at the sawyer's control stand so that the operator may delay operation of the dogs until the loader mechanism has positioned the log securely against the faces 56 of the knees 50.

Where the log to be sawed is short and not of sufficient length to extend across all head blocks, the dogs of the rearmost knees are preferably maintained open and retracted within the knee housing 50 so as not to protrude beyond the faces of the knees. This may be accomplished by providing a stop valve 155 (Figs. 3 and 24) in the line to the closed end of the cylinder 150 of the rearmost knee. This valve preferably has a spring pressed stem protruding slightly beyond the face 56 of the knee, to be engaged by a log thereagainst and admit fluid to cylinder 150 to actuate the dogs of that knee when there is a log to be engaged thereby.

The husk

As is usual in portable sawmills, the husk is positioned laterally adjacent the frame 1 and carriage 2 in its travel on the frame from the loading section A to the take-off section C. The husk comprises a frame 4 providing a mounting for the saw arbor 5 carrying the circular disc saw 6, and preferably houses the reservoir 22, as well as supports the various pumps, control and relief valves of the hydraulic system, as is apparent from Fig. 1. The saw arbor 5 drives the several pumps 20, 145 and 76, and conveniently the loader and turner pump 145 and the set works pump 76 are mounted on a common shaft.

The sawyer's control stand is advantageously a part of the husk frame 4 and provides a mounting for the feed works control valve 25, the turner and loader control valves 140 and 149, the selector or kicker control valve 117, as well as the control stand 85 mounting the set works control mechanism and control valve 78. Thus, from a single position at the sawyer's control stand, the sawyer may control the carriage feed works, the set works and the loading, turning, dogging and selecting of the logs.

In sawmills, including both hydraulic feed works and log-loading and turning mechanisms, as above described, it is advantageous to provide two separate pumps for the feed works, the combined capacity of which is adequate to move the carriage on its feed stroke at the desired rate, preferably approximately 300 feet per minute. This is effected in the illustrated embodiment by connecting the exhaust port 144 of the loader and turner valve to the inlet port 24 of the feed works control valve as shown in Figs. 1 and 3, so that when the loader and turner valve 140 is in neutral position, both pumps 20 and 145 supply fluid to the feed works valve 25. This provides a safety mechanism for the machine because it is impossible to operate the feed works at its feeding speed when the loader or turner control valve 140 is set to operate either the loader or turner mechanisms. It is, however, possible to "inch" the carriage 2 slowly by opening the feed works control valve 25 while the loader or turner mechanisms are set for operation in order to accurately position the carriage.

The numerous advantages of the invention will be apparent to persons skilled in the art from the above detailed description of one construction embodying the invention. The entire machine in all of its operation is under the control of a single operator, thus eliminating the hazardous duties of the skilled workman who formerly rode the carriage to control the set works and dogging mechanisms. The novel feed works of the invention in which the supply of hydraulic fluid is driven from the saw arbor provides a flexible control for the carriage which is moved proportionately to the resistance offered to the saw, and hence is a work-controlled feed.

The novel set works of the invention effects a quick and accurate setting of the knees by the operator, and gives him and the sawyer's control stand complete information as to the position of the knees away from the line of cut, and hence the thickness of the log remaining to be sawed.

The novel loading and turning mechanism is obviously not necessary to the operation of the feed works or set works mechanism, but is particularly advantageous in the handling of heavy logs of large diameter, which normally would require the service of two or more laborers.

Although we have illustrated and described a preferred construction of machine embodying the invention, we do not intend to be restricted thereto as the scope of the invention is best defined in the appended claims.

We claim:

1. In a sawmill, in combination with a rotary shaft having a saw mounted thereon, a carriage feed works comprising a hydraulic cylinder and piston device adapted to be mounted on a stationary track frame for moving a carriage thereon, a closed fluid system for supplying fluid to opposite ends of said cylinder and including a rotary pump, a driving connection from the saw shaft to said pump whereby the pump is driven at a speed proportionate to the speed of said saw shaft, and a manually controlled valve for regulating the flow of fluid from said pump to opposite ends of said cylinder.

2. In a sawmill, in combination with a rotary shaft having a saw mounted thereon, a carriage feed works comprising a hydraulic cylinder and piston device adapted to be mounted on a stationary track frame for moving a carriage thereon, a closed fluid system including a fluid-containing reservoir, a rotary pump for delivering fluid from said reservoir to said cylinder, operative connections between said pump and opposite ends of said cylinder including a manually controlled valve for selectively diverting the output of said pump to a selected end of said cylinder, and a driving connection from the saw shaft to said pump whereby the speed of carriage feed varies directly with the speed of revolution of the saw.

3. In a sawmill comprising a frame having a log holding deck, a carriage trackway and a husk supporting a power operated rotary saw, a reciprocating log feeding carriage riding on the trackway for moving the logs to and from the saw, a gate selector on the log holding deck for holding logs and releasing individual logs to the carriage, a pivoted loading arm on the log holding deck for moving a log onto the carriage, a plurality of log positioning knees mounted on the carriage for transverse movement thereon, log gripping dogs carried on each of the knees for transverse movement therewith on the carriage, and a pivoted log turner arm on the carriage for rolling a log off the carriage, hydraulic motor means for operating each of said sawmill devices auxiliary to the saw, means for supplying liquid under pressure to said motor means, control valve means operative to block the feed of liquid under pressure to the gate selector motor, the loading arm motor, the knees motors, the dogs motors and the log turner motor, said control valve means comprising means simultaneously operative to feed liquid under pressure to the carriage operating motor for advance and gig back strokes of the carriage, the last said means blocking the feed of liquid under pressure to at least one of the motors simultaneously with the feeding of liquid under pressure to the carriage operating motor.

4. In a sawmill comprising a frame having a log holding deck, a carriage trackway and a husk supporting a power operated rotary saw, a reciprocating log feeding carriage riding on the trackway for moving the logs to and from the saw, a pivoted loading arm on the log holding deck for moving a log onto the carriage, a plurality of log positioning knees mounted on the carriage for transverse movement thereon, log gripping dogs carried on each of the knees for transverse movement therewith on the carriage, and a pivoted log turner arm on the carriage for rolling a log off the carriage, hydraulic motor means for operating each of said sawmill devices auxiliary to the saw, means for supplying liquid under pressure to said motor means, control valve means operative to block the feed of liquid under pressure to the loading arm motor, the knees motors, the dogs motors and the log turner motor, said control valve means comprising means simultaneously operative to feed liquid under pressure to the carriage operating motor for advance and gig back strokes of the carriage, the last said means blocking the feed of liquid under pressure to at least one of the motors simultaneously with feeding of liquid under pressure to the carriage operating motor.

5. In a sawmill comprising a frame having a log holding deck, a carriage trackway and a husk supporting a power operated rotary saw, a reciprocating log feeding carriage riding on the trackway for moving the logs to and from the saw, a gate selector on the log holding deck for holding logs and releasing individual logs to the carriage, a pivoted loading arm on the log holding deck for moving a log onto the carriage, a plurality of log positioning knees mounted on the carriage for transverse movement thereon, log gripping dogs carried on each of the knees for transverse movement therewith on the carriage, and a pivoted log turner arm on the carriage for rolling a log off the carriage, hydraulic motor means for operating each of said sawmill devices auxiliary to the saw, means for supplying liquid under pressure to said motor means, and control valve means operative to feed operating liquid to one of said motor means and simultaneously operative to block the feed of the liquid to other of said motor means, said control valve means including means operative to block the feed of liquid to some of said motor means including said one motor means and operative to simultaneously feed liquid through said control valve means, and additional control valve means for receiving the liquid fed through the first control valve means and operative to feed said liquid to another of the motor means.

6. In a sawmill comprising a frame having a log holding deck, a carriage trackway and a husk supporting a power operated rotary saw, a reciprocating log feeding carriage riding on the trackway for moving the logs to and from the saw, a pivoted loading arm on the log holding deck for moving a log onto the carriage, a plurality of log positioning knees mounted on the carriage for transverse movement thereon, log gripping dogs carried on each of the knees for transverse movement therewith on the carriage, and a pivoted log turner arm on the carriage for rolling a log off the carriage, hydraulic motor means for operating each of said sawmill devices auxiliary to the saw, means for supplying liquid under pressure to each of said motor means, and control valve means operative to feed operating liquid to one of said motor means and simultaneously operative to block the feed of the liquid to other of said motor means, said control valve means including means operative to block the feed of liquid to said one motor means and to other of the motor means and operative to simultaneously feed liquid through said control valve means, and additional control valve means for receiving the liquid fed through the first control valve means and operative to feed said liquid to another of the motor means.

7. In a sawmill comprising a frame having a log holding deck, a carriage trackway and a husk supporting a power operated rotary saw, a reciprocating log feeding carriage riding on the trackway for moving the logs to and from the saw, a fluid pressure operated reciprocating motor for operating said carriage, a pivoted loading arm on the log holding deck for moving a log onto the carriage, a fluid pressure operated reciprocating motor for operating the loading arm, at least one log positioning knee mounted on the carriage for transverse movement thereon, means for traversing the knee, log gripping dogs carried on the knee for transverse movement therewith on the carriage, for gripping and releasing a log, a fluid pressure operated reciprocating motor on the knee for operating the dogs, a pivoted log turner arm on the carriage for rolling a log off the carriage, and a fluid pressure operated reciprocating motor for operating the log turner arm, means for supplying fluid under pressure to said motors, and control valve means for feeding operating fluid to the motor for operating the carriage in advance and gig back strokes and simultaneously blocking the feed of the fluid to the other motors.

8. In a sawmill comprising a frame having a log holding deck, a carriage trackway and a husk supporting a power operated rotary saw, a reciprocating log feeding carriage riding on the trackway for moving the logs to and from the saw, a fluid pressure operated reciprocating motor for operating said carriage, a pivoted loading arm on the log holding deck for moving a log onto the carriage, a fluid pressure operated reciprocating motor for operating the loading arm, at least one log positioning knee mounted on the carriage for transverse movement thereon, means for traversing the knee, log gripping dogs carried on the knee for transverse movement therewith on the carriage for gripping and releasing a log, a fluid pressure operated reciprocating motor on the knee for operating the dogs, a pivoted log turner arm on the carriage for rolling a log off the carriage, and a fluid pressure operated reciprocating motor for operating the log turner arm, means for supplying fluid under pressure to said motors, and control valve means for feeding operating fluid to the motor for operating the log loading arm and simultaneously blocking the feed of fluid to the other motors.

9. In a sawmill comprising a frame having a log holding deck, a carriage trackway and a husk supporting a power operated rotary saw, a reciprocating log feeding carriage riding on the trackway for moving the logs to and from the saw, a fluid pressure operated reciprocating motor for operating said carriage, a pivoted loading arm on the log holding deck for moving a log onto the carriage, a fluid pressure operated reciprocating motor for operating the loading arm, at least one log positioning knee mounted on the carriage for transverse movement thereon, means for traversing the knee, log gripping dogs carried on the knee for transverse movement therewith on the carriage for gripping and releasing a log, a fluid pressure operated reciprocating motor on the knee for operating the dogs, a pivoted log turner arm on the carriage for rolling a log off the carriage, and a fluid pressure operated reciprocating motor for operating the log turner arm, means for supplying fluid under pressure to said motors, and control valve means for feeding operating fluid to the motor for operating the dogs to grip a log on the carriage and simultaneously blocking the feed of fluid to the other motors.

10. In a sawmill comprising a frame having a log holding deck, a carriage trackway and a husk supporting a power operated rotary saw, a reciprocating log feeding carriage riding on the trackway for moving the logs to and from the saw, a fluid pressure operated reciprocating motor for operating said carriage, a pivoted loading arm on the log holding deck for moving a log onto the carriage, a fluid pressure operated reciprocating motor for operating the loading arm, at least one log positioning knee mounted on the carriage for transverse movement thereon, means for traversing the knee, log gripping dogs carried on the knee for transverse movement therewith on the carriage for gripping and releasing a log, a fluid pressure operated reciprocating motor on the knee for operating the dogs, a pivoted log turner arm on the carriage for rolling a log off the carriage, and a fluid pressure operated reciprocating motor for operating the log turner arm, means for supplying fluid under pressure to said motors, and control valve means for feeding operating fluid to the motors for the dogs and the log turner to release a log and roll it off the carriage and simultaneously blocking the feed of fluid to the other motors.

11. In a sawmill comprising a frame having a log holding deck, a carriage trackway and a husk supporting a power operated rotary saw, a reciprocating log feeding carriage riding on the trackway for moving the logs to and from the saw, a fluid pressure operated reciprocating motor for operating said carriage, at least one log positioning knee mounted on the carriage for transverse movement thereon, means on the carriage for traversing the knee, log gripping dogs carried on the knee for transverse movement therewith on the carriage, a fluid pressure operated reciprocating motor on the knee for operating the dogs on the knee to release a log, a pivoted log turner arm on the carriage for rolling a log off the carriage, and a fluid pressure operated reciprocating motor for operating the log turner arm to roll a log off the carriage, means for supplying fluid under pressure to said motors, and control valve means for feeding operating fluid to the dogs and log turner motors and simultaneously blocking the feed of fluid to the carriage motor or feeding operating fluid to the carriage motor and simultaneously blocking feed of the fluid to the dogs and log turner motors.

12. In a sawmill comprising a frame having a log holding deck, a carriage trackway and a husk supporting a power operated rotary saw, a reciprocating log feeding carriage riding on the trackway for moving the logs to and from the saw, means for reciprocating the carriage, a pivoted loading arm on the log holding deck for moving a log onto the carriage, a fluid pressure operated reciprocating motor for operating the loading arm, at least one log positioning knee mounted on the carriage for transverse movement thereon, means on the carriage for traversing the knee, log gripping dogs carried on the knee for transverse movement therewith on the carriage, a fluid pressure operated reciprocating motor on the knee for operating the dogs, a pivoted log turner arm on the carriage for rolling a log off the carriage, and a fluid pressure operated reciprocating motor for operating the log turner arm, means for supplying fluid under pressure to said motors, and control valve means operative to feed operating fluid to the dogs and log turner motors and simultaneously blocking the feed of the fluid to the loading arm motor or operative to feed operating fluid to the loading arm motor and simultaneously blocking feed of the fluid to the dogs and log turner motors.

13. In a sawmill comprising a frame having a log holding deck, a carriage trackway and a husk supporting a power operated rotary saw, a reciprocating log feeding carriage riding on the trackway for moving the logs to and from the saw, means for reciprocating the carriage, a plurality of log positioning knees mounted on the carriage for transverse movement thereon, a fluid pressure operated reciprocating motor for traversing the knees, a gate selector on the log holding deck for holding logs and releasing individual logs to the carriage, and a fluid pressure operated reciprocating motor for operating the gate selector, means for supplying fluid under pressure to said motors, and control valve means for feeding operating fluid to either one of the motors and simultaneously blocking the feed of the fluid to the other of the motors.

14. In a sawmill comprising a frame having a log holding deck, a carriage trackway and a husk supporting a power operated rotary saw, a reciprocating log feeding carriage riding on the trackway for moving the logs to and from the saw, means for reciprocating the carriage, a plurality of log positioning knees mounted on the carriage for transverse movement thereon, hydraulic motor means for traversing the knees, a gate selector on the log holding deck for holding logs and releasing individual logs to the carriage, and hydraulic motor means for operating the gate selector, means for supplying fluid under pressure to said motors, and control valve means for feeding operating fluid to either one of the motors and simultaneously blocking the feed of the fluid to the other of the motors.

15. In a sawmill comprising a frame having a log holding deck, a carriage trackway and a husk supporting a power operated rotary saw, a reciprocating log feeding carriage riding on the trackway for moving the logs to and from the saw, means for reciprocating the carriage, a plurality of log positioning knees mounted on the carriage for transverse movement thereon, hydraulic motor means for traversing the knees, a gate selector on the log holding deck for holding logs and releasing individual logs to the carriage, and hydraulic motor means for operating the gate selector, means for supplying fluid under pressure to said motors, and a control valve for feeding operating fluid to the gate selector motor and simultaneously blocking the feed of fluid to the knees motor or feeding fluid through the valve and simultaneously blocking feed of the fluid to the gate selector motor, a second control valve for receiving fluid fed through the first control valve and feeding said fluid to the knees motor.

16. In a sawmill comprising a frame having a log holding deck, a carriage trackway and a husk supporting a power operated rotary saw, a reciprocating log feeding carriage riding on the trackway for moving the logs to and from the saw, means for reciprocating the carriage, a plurality of log positioning knees mounted on the carriage for transverse movement thereon, hydraulic motor means for traversing the knees, a gate selector on the log holding deck for holding logs and releasing individual logs to the carriage, and hydraulic motor means for operating the gate selector, means for supplying fluid under pressure to said motors, control valve means for feeding operating fluid to either one of the motors and simultaneously blocking the feed of the fluid to the other of the motors, and means responsive to the predetermined operation of the knees motor to stop the operation of that motor.

17. In a sawmill comprising a frame having a log holding deck, a carriage trackway and a husk supporting a power operated rotary saw, a reciprocating log feeding carriage riding on the trackway for moving the logs to and from the saw, hydraulic motor means for operating said carriage, a pivoted loading arm for moving a log onto the carriage, hydraulic motor means for operating the loading arm, a plurality of log positioning knees mounted on the carriage for tranverse movement thereon, means for traversing the knees, log gripping dogs carried on each of the knees for transverse movement therewith on the carriage to grip or release a log, hydraulic motor means on each of the knees for operating the dogs, a pivoted log turner arm on the carriage for rolling a log off the carriage, and hydraulic motor means for operating the log turner arm, means for supplying operating fluid under pressure to said motor means, and control valve means for feeding operating fluid to each of the loading arms, dogs and turner arm motor means and simultaneously blocking the feed of fluid to the carriage motor means or feeding fluid through the control valve means and simultaneously blocking the feed of fluid to the loading arm, dogs and turner arm motor means, and means to receive the fluid fed through the control valve means and feeding said fluid to the carriage motor means.

WILLIAM H. WATSON.
ROBERT L. NELSON.

References Cited in the file of this patent

UNITED STATES PATENTS

| Number | Name | Date |
|---|---|---|
| 138,206 | Smith | Apr. 22, 1873 |
| 251,269 | Mee | Dec. 20, 1881 |
| 259,936 | Smith et al. | June 20, 1882 |
| 274,286 | Davies | Mar. 20, 1883 |
| 313,531 | Robb | Mar. 10, 1885 |
| 330,020 | Harbach | Nov. 10, 1885 |
| 351,974 | Gleason | Nov. 2, 1886 |
| 370,413 | Rinderknecht | Sept. 27, 1887 |
| 408,760 | Simonson | Aug. 13, 1889 |
| 448,592 | Simonson | Mar. 17, 1891 |
| 497,768 | Cole | May 23, 1893 |
| 714,269 | Walton | Nov. 25, 1902 |
| 949,068 | Garland | Feb. 15, 1910 |
| 958,853 | Bulley | May 24, 1910 |
| 1,016,759 | Michel | Feb. 6, 1912 |
| 1,230,969 | Wilkin | June 26, 1917 |
| 1,394,128 | Weir | Oct. 18, 1921 |
| 1,436,623 | Lueth | Nov. 21, 1922 |
| 1,437,846 | Hilke | Dec. 5, 1922 |
| 1,544,584 | Ireland et al. | July 7, 1925 |
| 1,561,342 | Martin | Nov. 10, 1925 |
| 1,590,105 | Martin | June 22, 1926 |
| 1,633,920 | Bradford | June 28, 1927 |
| 1,721,835 | Schnell | July 23, 1929 |
| 1,741,951 | Pelton | Dec. 31, 1929 |
| 1,781,220 | Ferris | Nov. 11, 1930 |
| 1,842,465 | Weber | Jan. 26, 1932 |
| 1,880,780 | Cahoon | Oct. 4, 1932 |
| 1,930,014 | Martin | Oct. 10, 1933 |
| 2,318,163 | Kahr | May 4, 1943 |
| 2,342,967 | Peters | Feb. 29, 1944 |
| 2,365,095 | Miller et al. | Dec. 12, 1944 |
| 2,382,837 | Weber | Aug. 14, 1945 |
| 2,392,504 | Readman et al. | Jan. 8, 1946 |